United States Patent [19]
Davenport et al.

[11] Patent Number: 5,479,545
[45] Date of Patent: Dec. 26, 1995

[54] REVERSE FLARED OPTICAL COUPLING MEMBER FOR USE WITH A HIGH BRIGHTNESS LIGHT SOURCE

[75] Inventors: John M. Davenport, Lyndhurst; Richard L. Hansler, Pepper Pike; Kenneth S. King, Willoughby Hills; John W. Munk, Jr., Chesterland; Richard C. Nagle, Euclid, all of Ohio

[73] Assignee: General Electric Company, Schenectady, N.Y.

[21] Appl. No.: 859,176

[22] Filed: Mar. 27, 1992

[51] Int. Cl.$^6$ ........................................... G02B 6/26
[52] U.S. Cl. .................. 385/43; 362/32; 385/31; 385/46; 385/901
[58] Field of Search ............... 362/32; 385/15, 385/31, 33, 34, 38, 43, 46, 52, 88, 92, 147, 900, 901

[56] References Cited

U.S. PATENT DOCUMENTS

| | | | |
|---|---|---|---|
| Re. 33,722 | 10/1991 | Scifres et al. | 385/33 |
| 3,832,028 | 8/1974 | Kapron | 385/43 |
| 3,901,581 | 8/1975 | Thiel | 385/24 |
| 4,002,499 | 1/1977 | Winston | 136/206 |
| 4,089,583 | 5/1978 | Auracher et al. | 385/31 |
| 4,200,356 | 4/1980 | Hawkes et al. | 385/43 |
| 4,516,828 | 5/1985 | Steele | 385/24 |
| 4,521,070 | 6/1985 | Sottini et al. | 385/31 |
| 4,678,267 | 7/1987 | Burns et al. | 385/43 |
| 4,744,615 | 5/1988 | Fan et al. | 385/146 |
| 4,784,877 | 11/1988 | Trumble | 427/163 |
| 4,807,954 | 2/1989 | Oyamada et al. | 385/43 |
| 4,807,963 | 2/1989 | Iwasaki | 385/115 |
| 4,958,263 | 9/1990 | Davenport et al. | 362/32 |
| 5,035,480 | 7/1991 | Dutt | 385/43 X |
| 5,058,985 | 10/1991 | Davenport et al. | 385/115 |
| 5,059,013 | 10/1991 | Jain | 359/503 |

FOREIGN PATENT DOCUMENTS

| | | | |
|---|---|---|---|
| 57-58113 | 4/1982 | Japan | 385/43 |
| 63-163410 | 7/1988 | Japan | 385/46 |

Primary Examiner—John D. Lee
Attorney, Agent, or Firm—George E. Hawranko; Stanley C. Corwin

[57] ABSTRACT

An optical coupling assembly is useful for coupling a source of light, having high brightness and being non-coherent and focussed at a focal plane, to a plurality of optical light conductors. The coupling assembly includes an elongated light transmissive coupling member which has a central longitudinal axis and is disposed between the focal plane of the light source and leading ends of the optical light conductors. The coupling member includes oppositely flared front and rear end portions and a middle portion disposed along the longitudinal axis, with the middle portion extending between and connected to the front and rear end portions. The coupling member can have either a solid or tubular configuration. The middle portion of the coupling member has cylindrical shape and cross-sectional size of uniform dimensions and being less than the respective cross-sectional sizes of an inlet end of the front end portion and an outlet end of the rear end portion. The front end portion of the coupling member can have either a frusto-conical or parabolic shape, whereas the rear end portion can have a frusto-conical or parabolic shape being oriented in the reverse of the frusto-conical or parabolic shape of the front end portion. The rear end portion has a greater axial length than the front end portion and the outlet end of the rear end portion is larger in size than the inlet end of the front end portion.

27 Claims, 3 Drawing Sheets

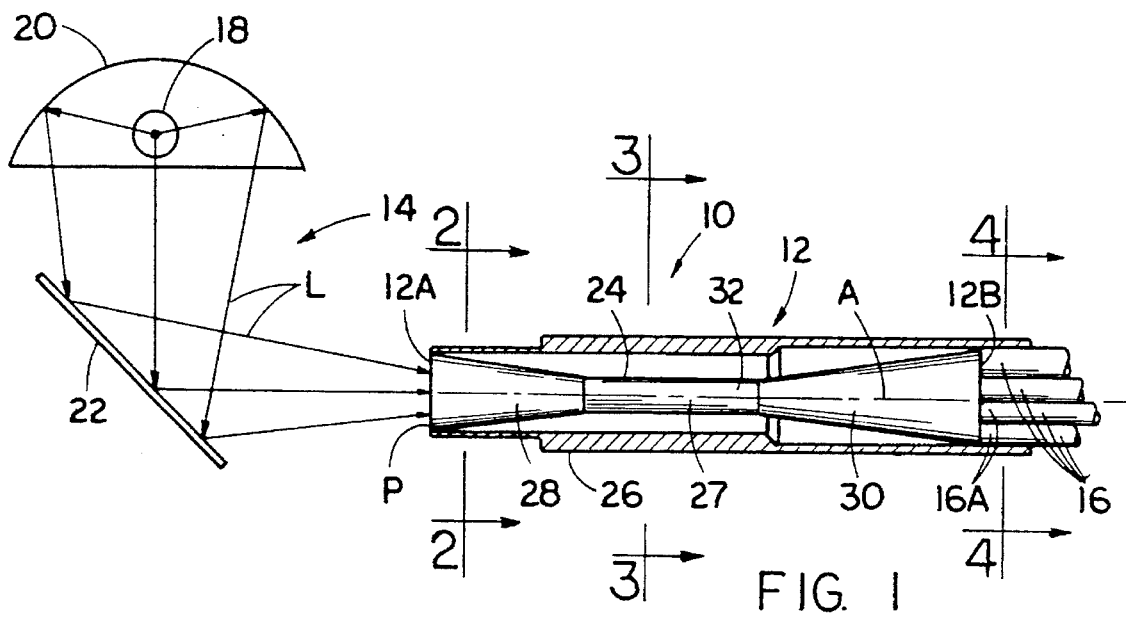
FIG. 1
FIG. 2
FIG. 3
FIG. 4
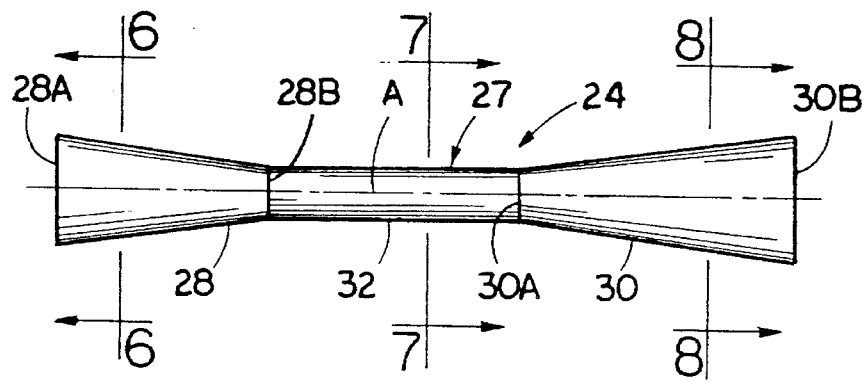
FIG. 5
FIG. 6
FIG. 7
FIG. 8

REVERSE FLARED OPTICAL COUPLING MEMBER FOR USE WITH A HIGH BRIGHTNESS LIGHT SOURCE

CROSS-REFERENCE TO RELATED APPLICATIONS

Reference is hereby made to the following copending U.S. patent applications dealing with related subject matter and assigned to the assignee of the present invention:

1. "Coupler Apparatus For Use With A High Brightness Light Source" by John M. Davenport et al, assigned U.S. Ser. No. 07/859,186 and filed Mar. 27, 1992. (LD 10,426) (now U.S. Pat. No. 5,259,056).

2. "High Brightness Discharge Light Source" by Gary Allen et al, assigned U.S. Ser. No. 07/858,906 and filed Mar. 27, 1992. (LD 10,333) (now U.S. Pat. No. 5,239,230).

3. "Optical Coupling Assembly For Use With A High Brightness Light Source" by John M. Davenport et al, assigned U.S. Ser. No. 07/859,180 and filed Mar. 27, 1992. (LD 10,424) (now abandonded).

4. "Polygonal-Shaped Optical Coupling Member For Use With A High Brightness Light Source" by John M. Davenport et al, assigned U.S. Ser. No. 07/859,179 and filed Mar. 27, 1992. (LD 10,438) (now U.S. Pat. No. 5,341,445).

BACKGROUND OF THE INVENTION

1. Field of the Invention

The present invention relates generally to optical coupling of a high brightness light source to a plurality of optical light conductors and, more particularly, to a reverse flared optical coupling member providing an increased number of internal reflections and improved coupling efficiency.

2. Description of the Prior Art

Central lighting systems wherein a single light source is used to supply light output to a number of spaced apart locations using a plurality of optical light conductors, such as optical tubes, rods or fibers, have been proposed for a number of different applications including automotive, display and home lighting. For instance, U.S. Pat. No. 4,958,263 issued to Davenport et al and assigned to the same assignee as the present invention discloses the use of a central lighting system for an automotive application.

The light source for such a central lighting system must be capable of providing a light output having high brightness characteristics so as to ensure sufficient light output at the spaced apart locations. One suitable light source having a high brightness characteristic measuring in excess of 50,000 lumens per square centimeter is disclosed in the second patent application cross-referenced above. Such a light source when used in conjunction with a suitable reflector, such as one having an ellipsoidal shape, and a mirror element to focus the light output on the ends of optical fibers disposed at an optical focal plane of the reflector can produce a non-coherent high brightness focussed light output capable of causing physical damage to the ends of the optical fibers. To avoid the possible damage to the ends of the optical fibers, a light coupling member in the form of an one-piece optical cylindrical coupler rod relatively short in length is interposed between the optical focal point and the ends of the optical fibers. The light output travels through multiple internal reflections through the light coupling member from the optical focal point to the optical fibers.

Also, the non-coherent high brightness light output image produced by the light source and focussed by the ellipsoidal reflector tends to be brightest and more blue in color at the center of the light output and dimmer and more red in color around the outer edge of the light output. When the light output enters the cylindrical optical coupling member, the multiple internal reflections tend to achieve some mixing of the light and thereby reducing the differences in intensity and color from the outer edge to the center of the light output entering the optical fibers.

In order to achieve more uniform light intensity and color, heretofore light has been transmitted through a tubular light coupling member having a substantially constant diameter. One important drawback of such coupling member is that it has needed to have a relatively long length to achieve the desired uniformity of light intensity and color. A cylindrical light coupling member of sufficient length to provide adequate light mixing would be too long for the central lighting system in the automotive lighting application.

Therefore, a need remains for improvement of the design of optical coupling member so as to increase light mixing while reducing substantially the length of the coupling member.

SUMMARY OF THE INVENTION

The present invention provides a reverse flared optical coupling member designed to satisfy the aforementioned needs. The reverse flared optical coupling member of the present invention provides an increased number of internal reflections per unit length which achieves a more uniform distribution of the light intensity and improved color mixing over that achieved by a cylindrical tubular coupling member of greater axial length. Also, the coupling member of the present invention outputs light in a solid angle relative to its longitudinal axis that is less than the solid angle at which light is inputted to the coupling member which improves the light coupling efficiency achieved over that achieved by the cylindrical tubular coupling member of greater axial length. Further, the larger flared rear output end portion of the coupling member compared to the smaller flared front input end portion of the coupling member produces a larger area of light output compared to the light input from the source.

Accordingly, the present invention is directed to an optical coupling member for use in coupling noncoherent light from a source focussed at a focal plane to a plurality of optical light conductors. The coupling member comprises an elongated light transmissive body having a central longitudinal axis and being disposed between the focal point of the light source and leading ends of the plurality of optical light conductors. The elongated body includes a pair of reversely oriented flared front and rear end portions and a middle portion disposed in serial relationship along the longitudinal axis, with the middle portion extending between and connected to the front and rear end portions for providing improved uniformity of light intensity distribution, mixing of light color and efficiency of light coupling.

The coupling member body can have either a solid or tubular configuration. The middle portion of the coupling member body has a cylindrical shape and cross-sectional size of uniform dimensions. The cross-sectional size of the middle portion is less than the respective cross-sectional sizes of an inlet end of the front end portion and an outlet end of the rear end portion.

In one embodiment, the front end portion of the coupling member body has a first frusto-conical shape while the rear end portion has a second frusto-conical shape being oriented in the reverse of the first frusto-conical shape of the front end portion. In another embodiment, the front end portion of the coupling member body has a first parabolic shape while the rear end portion has a second parabolic shape being the oriented in the reverse of the first parabolic shape of the front end portion. In both embodiments, the rear end portion has a greater axial length than the front end portion and the outlet end of the rear end portion is larger in size than the inlet end of the front end portion.

Also, the present invention is directed to an optical lighting system which includes a non-coherent high brightness source of light, being focussed at the focal plane, a plurality of optical light conductors, and an optical coupling assembly. The optical coupling assembly comprises the above-defined coupling member and means for retaining the coupling member in coupling relationship with the leading ends of the light conductors.

These and other features and advantages and attainments of the present invention will become apparent to those skilled in the art upon a reading of the following detailed description, when taken in conjunction with the drawings, wherein there is shown and described an illustrative embodiment of the invention.

BRIEF DESCRIPTION OF THE DRAWINGS

In the following detailed description, wherein like reference characters designate like or corresponding parts throughout the several views, reference will be made to the attached drawings in which:

FIG. 1 is a longitudinal elevational view partly in section of an optical coupling assembly of the present invention having an optical coupling member for optically coupling a high brightness focussed light source to a plurality of optical light conductors.

FIG. 2 is an enlarged cross-sectional view of the coupling assembly taken along line 2—2 of FIG. 1.

FIG. 3 is another enlarged cross-sectional view of the coupling assembly taken along line 3—3 of FIG. 1.

FIG. 4 is still another enlarged cross-sectional view of the coupling assembly taken along line 4—4 of FIG. 1.

FIG. 5 is an enlarged longitudinal elevational view of a first embodiment of the optical coupling member of FIG. 1.

FIG. 6 is an enlarged cross-sectional view of a front flared end portion of the coupling member taken along line 6—6 of FIG. 5.

FIG. 7 is an enlarged cross-sectional view of a middle portion of the coupling member taken along line 7—7 of FIG. 5.

FIG. 8 is an enlarged cross-sectional view of a rear flared end portion of the coupling member taken along line 8—8 of FIG. 5.

DETAILED DESCRIPTION OF THE INVENTION

Figure 9:
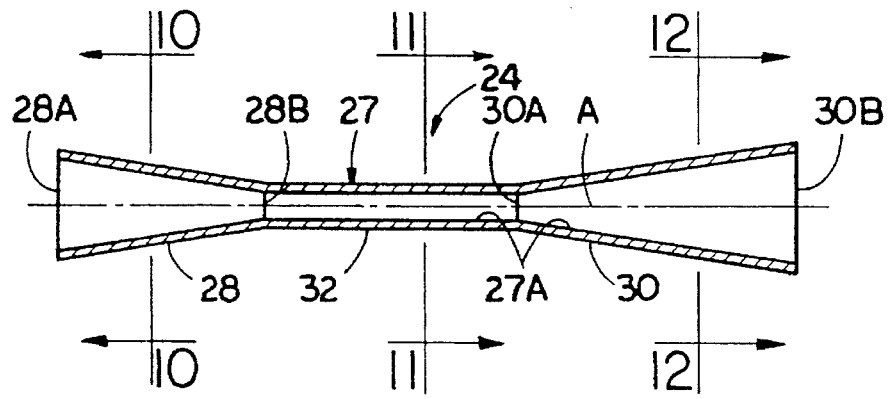
FIG. 9 is an enlarged longitudinal elevational view of a second embodiment of the optical coupling member.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1–4, there is illustrated an optical lighting system, generally designated 10, which includes an optical coupling assembly 12 of the present invention interfacing or coupling a source of light 14 with leading ends 16A of a plurality of optical light conductors 16 of the lighting system 10. Preferably, although not necessarily, the source of light 14 includes a lamp 18 capable of generating a non-coherent high brightness light output L, a reflector element 20, such as one having an ellipsoidal shape, and a mirror element 22, such as one having a planar shape, which together are operable to generate, and arranged to focus, an image of the non-coherent high brightness light output L at an optical focal plane P located at an input end 12A of the optical coupling assembly 12. The term "high brightness" refers to any light source with an output of approximately 50,000 lumens per square centimeter effective brightness, however, the subject invention is not limited to a high brightness light source and is equally applicable to any brightness light source. A suitable light source 14 which can be employed in the lighting system 10 is the one disclosed in the second patent application cross-referenced above, the disclosure of which is incorporated herein by reference thereto.

Referring to FIGS. 1–4, the optical coupling assembly 12 basically includes an elongated coupling member 24 of the present invention having a central longitudinal axis A and being disposed between the light source 14 and the leading ends 16A of the optical light conductors 16, and means 26 for retaining the coupling member 24 in an optically coupled relationship with the leading ends 16A of the light conductors 16. The coupling member 24 is constructed of a suitable light transmissive material such as quartz or a suitable plastic. In the illustrated embodiment, the retaining means 26 is a hollow sleeve-shaped member capable of receiving and retaining the coupling member 24 and the leading ends 16A of the light conductors 16 in an optically coupled relationship with each other. A suitable retaining means 26 which can be employed in the optical coupling assembly 12 is the one disclosed in the first patent application cross-referenced above, the disclosure of which is incorporated herein by reference thereto. Alternatively, the leading ends 16A of the light conductors 16 can be adhered to the output end of the coupling member 24 by the application of a suitable adhesive between the adjacent faces thereof. As an alternative embodiment, with respect to the tubular configuration of the coupling member 24 as described hereafter, the light source 14 and the leading ends 16A of the optical light conductors 16 can be placed within the opposite ends of the coupler member 24, thereby eliminating the need for a separate retaining member 26.

Figure 13:
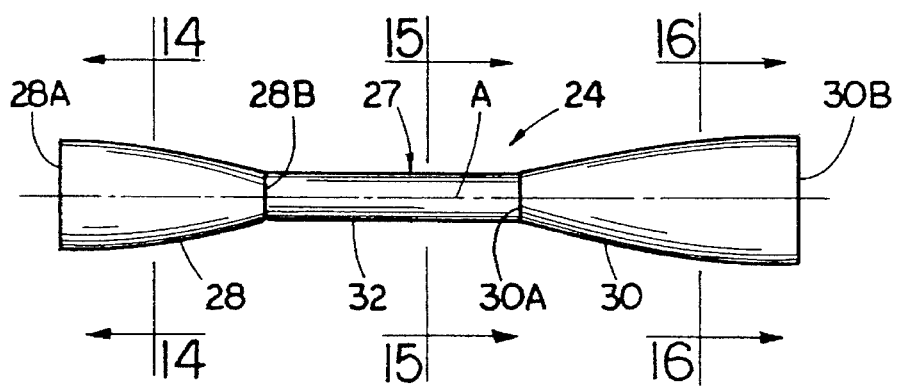
FIG. 13 is an enlarged longitudinal elevational view of a third embodiment of the optical coupling member.
Figure 17:
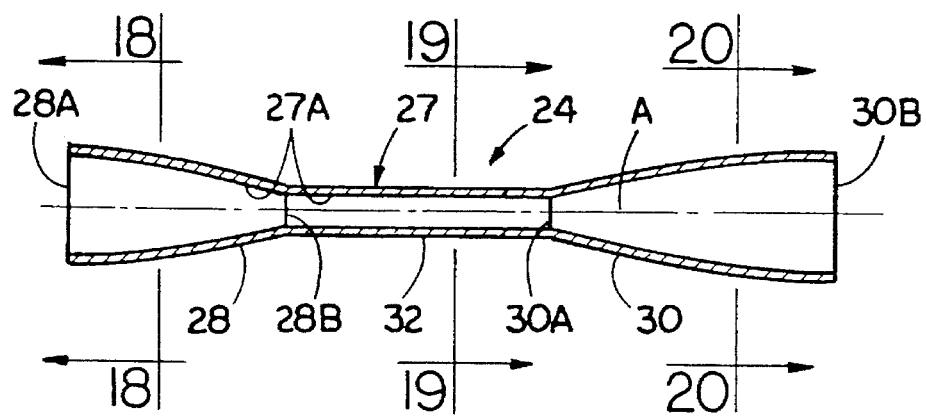
FIG. 17 is an enlarged longitudinal elevational view of a fourth embodiment of the optical coupling member.

Four different embodiments of the elongated coupling member 24 are illustrated in respective FIGS. 5, 9, 13 and 17. The coupling member 24 of each different embodiment is in the form of an elongated light transmissive body 27 which has a pair of reversely or oppositely flared front and rear end portions 28, 30 and a middle portion 32 being disposed in a serial relationship along and symmetrically about the central longitudinal axis A. The middle portion 34 of each different embodiment of the body 27 has a cylindrical shape and extends between and is integrally connected to the front and rear end portions 28, 30. In each different embodiment of the body 27, the rear end portion 30 has a greater axial length than the front end portion 28. Also, in each different embodiment of the body 27, an outlet end 30A of the rear end portion 30 is larger in size than an inlet end 28A of the front end portion 28 so as to provide a larger area of light output compared to the area of light input. The reverse flared front and rear end portions 28, 30 and uniform middle portion 32 of the coupling member 24 contribute to achievement of a more uniform distribution of light intensity, an increase in light coupling efficiency, and an increase in the color mixing of the light over that which can be achieved by using a cylindrical coupling member having greater axial length than the coupling member 24.

Figure 10:
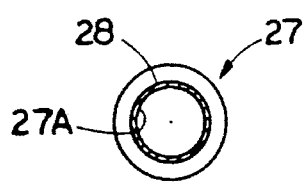
FIG. 10 is an enlarged cross-sectional view of the front flared end portion of the coupling member taken along line 10—10 of FIG. 9.
Figure 11:
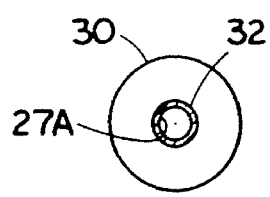
FIG. 11 is an enlarged cross-sectional view of the middle portion of the coupling member taken along line 11—11 of FIG. 9.
Figure 12:
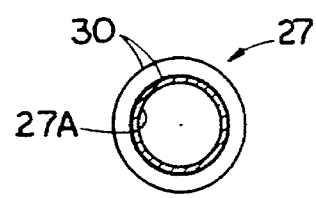
FIG. 12 is an enlarged cross-sectional view of the rear flared end portion of the coupling member taken along line 12—12 of FIG. 9.

The first embodiment of the body 27 of the coupling member 24 being shown in FIGS. 5–8 has a solid configuration. The second embodiment of the body 27 of the coupling member 24 being shown in FIGS. 9–12 has a tubular configuration. The elongated tubular body 27 has an internal circumferential surface 27A preferably coated with a highly reflective material. The front end portion 28 of each of the first and second embodiments of the body 27 of the coupling member body 24 has a first frusto-conical shape in which the diameter of the front end portion 28 decreases from its inlet end 28A to its outlet end 28B. The rear end portion 30 of each of the first and second embodiments of the body 27 of the coupling member body 24 has a second frusto-conical shape being oriented in the reverse of the first frusto-conical shape of the front end portion 28 of the body 27. Thus, the diameter of the rear end portion 30 of the body 27 increases from its inlet end 30A to its outlet end 30B.

Figure 14:
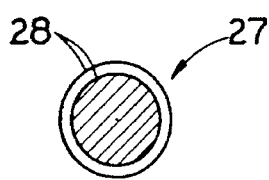
FIG. 14 is an enlarged cross-sectional view of the front flared end portion of the coupling member taken along line 14—14 of FIG. 13.
Figure 15:
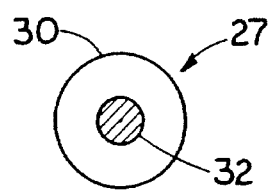
FIG. 15 is an enlarged cross-sectional view of the middle portion of the coupling member taken along line 15—15 of FIG. 13.
Figure 16:
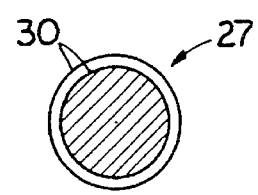
FIG. 16 is an enlarged cross-sectional view of the rear flared end portion of the coupling member taken along line 16—16 of FIG. 13.
Figure 18:
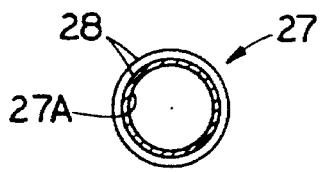
FIG. 18 is an enlarged cross-sectional view of the front flared end portion of the coupling member taken along line 18—18 of FIG. 17.
Figure 19:
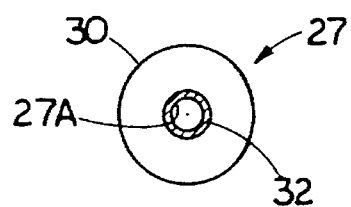
FIG. 19 is an enlarged cross-sectional view of the middle portion of the coupling member taken along line 19—19 of FIG. 17.
Figure 20:
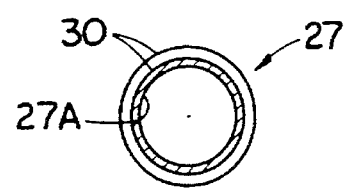
FIG. 20 is an enlarged cross-sectional view of the rear flared end portion of the coupling member taken along line 20—20 of FIG. 17.

The third embodiment of the body 27 of the coupling member body 24 being shown in FIGS. 13–16 has a solid configuration. The fourth embodiment of the body 27 of the elongated coupling member body 24 being shown in FIGS. 17–20 has a tubular configuration. Here likewise, the elongated tubular body 27 has the internal circumferential surface 27 preferably coated with a highly reflective material. The front end portion 28 of each of the third and fourth embodiments of the body 27 of the coupling member body 24 has a parabolic shape (or compound parabolic configuration), whereas the rear end portion 30 of the tubular coupling body 27 of each of these embodiments has a parabolic shape (or compound parabolic configuration) being oriented in the reverse of said parabolic shape of the front end portion 28 of the body 27. Thus, the diameter of the front end portion 28 of the body 27 decreases from the inlet end 28A to the outlet end 28B thereof, whereas the diameter of the rear end portion 30 of the body 27 increases from the inlet end 30A to the outlet end 30B thereof. It should be understood that the respective angle and curvature of the flared and parabolic shapes of the front end portions 28 of the body 27 can be different than the respective angle and curvature of the flared and parabolic shapes of the rear end portions 30 of the body 27.

With the body 27 of the coupling member 24 having the configuration of any of the above-described four embodiments, it is readily apparent that the number of internal reflections per unit length are thereby substantially increased over that in the case of a cylindrical coupling member in thereby causing an increased mixing of the outer and central portions of the light so as to substantially reduce the color differences to a point where they are not noticeable at the output end 12B of the coupling assembly 12.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. An optical coupling member for use in coupling a source of light to a plurality of optical light conductors, said coupling member comprising:

(a) an elongated light transmissive body having a central longitudinal axis and being disposable between the light source and leading ends of the plurality of optical light conductors;

(b) said body including a pair of oppositely flared front and rear end portions and a substantially cylindrically-shaped middle portion disposed along and symmetrically about said longitudinal axis, said front end portion having an input end face and said rear end portion having an output end face, said middle portion extending between and connected to the front and rear end portions and having a length effective for providing improved uniformity of light intensity distribution, mixing of light color, and efficiency of light coupling; and (c) wherein said rear end portion is longer than said front end portion.

2. The coupling member as recited in claim 1, wherein said middle portion of said elongated body has a cross-sectional size of substantially uniform dimensions.

3. The coupling member as recited in claim 1, wherein said elongated body has a solid configuration.

4. The coupling member as recited in claim 1, wherein said elongated body has a tubular configuration.

5. The coupling member as recited in claim 4, wherein said elongated body has an internal circumferential surface being coated with a highly reflective material.

6. The coupling member as recited in claim 1, wherein said middle portion of said elongated body has a cross-sectional size being less than the respective cross-sectional sizes of an inlet end of said front end portion and an outlet end of said rear end portion.

7. The coupling member as recited in claim 6, wherein:

said front end portion has a first frusto-conical shape; and said rear end portion has a second frusto-conical shape being oriented in the reverse of said first frusto-conical shape of said front end portion.

8. The coupling member as recited in claim 7, wherein:
said rear end portion has a greater axial length than said front end portion; and
said outlet end of said rear end portion is larger in size than said inlet end of said front end portion.

9. The coupling member as recited in claim 6, wherein:
said front end portion has a parabolic shape; and
said rear end portion has a parabolic shape being oriented in the reverse of said parabolic shape of said front end portion.

10. The coupling member as recited in claim 9, wherein:
said rear end portion has a greater axial length than said front end portion; and
said outlet end of said rear end portion is larger in size than said inlet end of said front end portion.

11. The optical coupling member as recited in claim 1, wherein said input end face is adapted to directly couple the source of light with said front end portion.

12. The optical coupling member as recited in claim 11, wherein said output end face is adapted to directly couple said rear end portion with the plurality of optical light conductors.

13. The optical coupling member as recited in claim 1, wherein said length of said middle portion is greater than a diameter of said middle portion.

14. The optical coupling member as recited in claim 1, wherein said length of said middle portion is greater than a length of said front end portion.

15. The optical coupling member as recited in claim 14, wherein said length of said middle portion is less than a length of said rear end portion.

16. In an optical lighting system including a non-coherent source of light and a plurality of optical light conductors, an optical coupling assembly comprising:
(a) an elongated light transmissive coupling member having a central longitudinal axis and being disposable between the light source and leading ends of the plurality of optical light conductors; and
(b) means for retaining said coupling member in an optically coupled relationship with the leading ends of said light conductors;
(c) said coupling member including a pair of oppositely flared front and rear end portions and a substantially cylindrically-shaped middle portion disposed along and symmetrically about said longitudinal axis, said front end portion having an input end face and said rear end portion having an output end face, said middle portion extending between and connected to said front and rear end portions and having a length effective for providing improved uniformity of light intensity distribution, mixing of light color, and efficiency of light coupling; and
(d) wherein said rear end portion is longer than said front end portion 17. The lighting system as recited in claim 16, wherein said light source includes:
a lamp capable of generating the non-coherent light output;
a reflector element having an ellipsoidal shape; and
a mirror element having a planar shape, said lamp, reflector element and mirror element together being operable to generate, and being arranged to direct, an image of the non-coherent light output to an input end of said optical coupling assembly.

18. The lighting system as recited in claim 16, wherein said retaining means is a hollow sleeve-shaped member capable of receiving and retaining said elongated member and said leading ends of the light conductors in optically coupled relationship with one another.

19. The lighting system as recited in claim 16, wherein said middle portion of said elongated member has a cross-sectional size of substantially uniform dimensions.

20. The lighting system as recited in claim 16, wherein said elongated member has a solid configuration.

21. The lighting system as recited in claim 16, wherein said elongated member has a tubular configuration.

22. The lighting system as recited in claim 21, wherein said elongated member has an internal circumferential surface being coated with a highly reflective material.

23. The lighting system as recited in claim 16, wherein said middle portion of said elongated member has a cross-sectional size being less than the respective cross-sectional sizes of an inlet end of said front end portion and an outlet end of said rear end portion.

24. The lighting system as recited in claim 23, wherein:
said front end portion has a first frusto-conical shape; and
said rear end portion has a second frusto-conical shape being oriented in the reverse of said first frusto-conical shape of said front end portion.

25. The lighting system as recited in claim 24, wherein:
said rear end portion has a greater axial length than said front end portion; and
said outlet end of said rear end portion is larger in size than said inlet end of said front end portion.

26. The lighting system as recited in claim 23, wherein:
said front end portion has a parabolic shape; and
said rear end portion has a parabolic shape being oriented in the reverse of said parabolic shape of said front end portion.

27. The lighting system as recited in claim 26, wherein:
said rear end portion has a greater axial length than said front end portion; and
said outlet end of said rear end portion is larger in size than said inlet end of said front end portion.

* * * * *